Patented Feb. 11, 1930

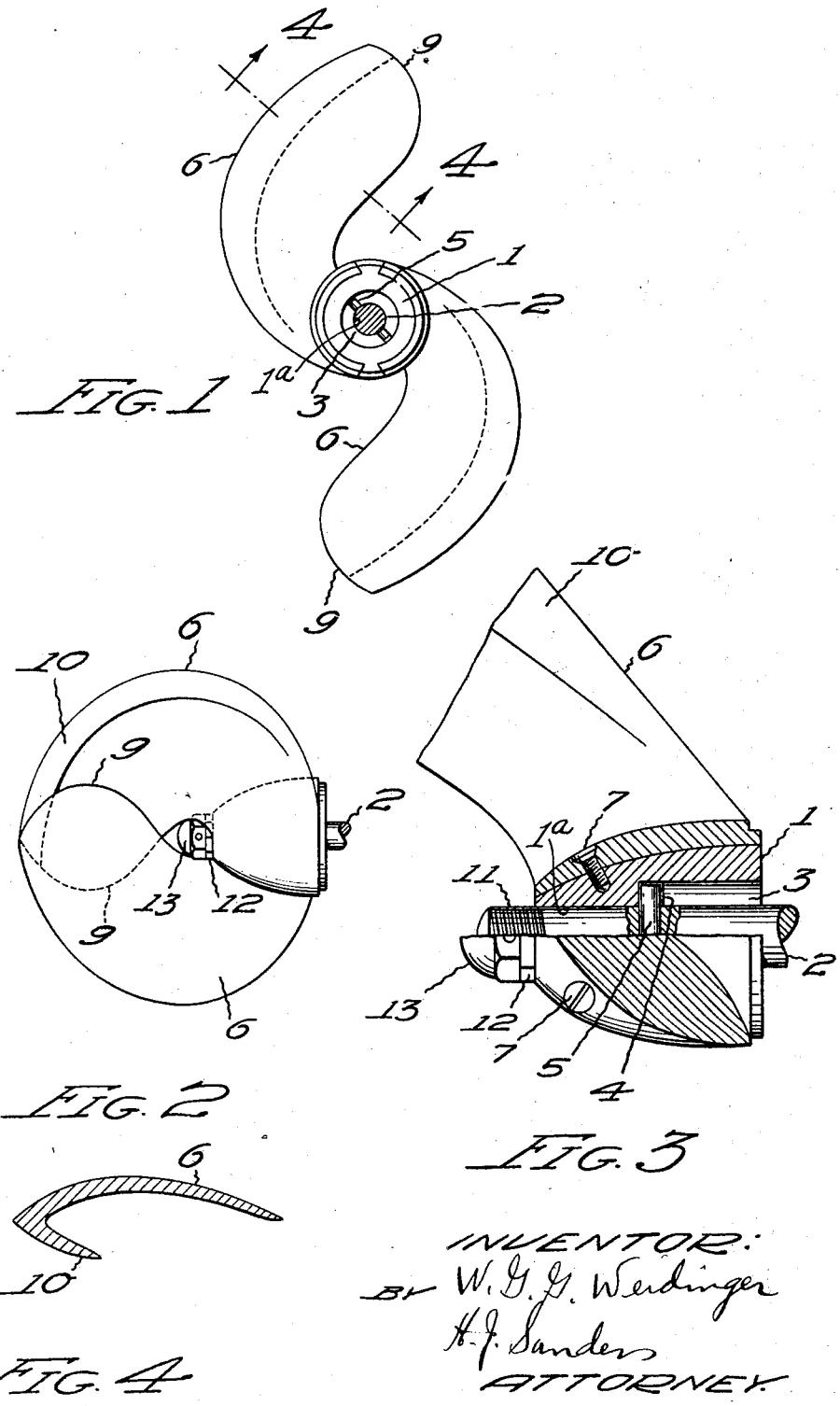

1,746,806

UNITED STATES PATENT OFFICE

WILLIAM G. G. WEIDINGER, OF CHICAGO, ILLINOIS

PROPELLER

Application filed September 29, 1927. Serial No. 222,811.

This invention relates to improvements in aerial and marine propellers and its object primarily is to provide a propeller that is simple in construction, efficient in operation, durable, and cheap to manufacture.

With the foregoing and other objects in view the invention consists in the combination and arrangement of parts to be hereinafter fully described, pointed out in the claim and illustrated in the accompanying drawing which forms a part of this application and in which—

Fig. 1 is a view of the propeller in front end elevation.

Fig. 2 is a top plan view of Fig. 1.

Fig. 3 is an enlarged view in side elevation and partly in section.

Fig. 4 is a cross section taken on line 4—4 of Fig. 1.

Like reference characters denote corresponding parts throughout the several views. The present propeller is designed with a view to easy assembly of the parts, cheapness of manufacture due to the fact that the blades, hub, shaft and smaller parts are made separate and then secured together. The propeller is readily taken apart to facilitate shipment, replacement of parts and the like and to make easy such repairs as may from time to time be necessary.

The blades, two in number, extend obliquely upward or upward and rearwardly and each is secured to the hub by a single screw. The reference numeral 1 denotes the hub which is secured to the shaft 2, the hub being formed with a bore 1ª and a relatively wide recess 3 extending inwardly from one end of the hub to said bore, said recess comprising the contracted portion 4 adapted to receive the pin 5 that extends through the shaft 2, the recess 3 forming clearance in the hub for the introduction of the pin 5 as the shaft with said pin extending therethrough is introduced into the hub. When the propeller is used as an aerial propeller the pin may extend through a perforation in the hub to secure the same more firmly to the shaft 2.

The wings 6, two in number, are each secured to the hub by a screw 7, each wing extending outwardly obliquely and rearwardly from the hub. The wings are formed with rounded ends 9 and with the reversely curved minor portions 10 which act with the major wing portions to grip the air as the shaft revolves.

The outer end of the shaft 2 is formed with the threads 11 to receive the nut 12 and the cap nut 13 which nuts act in conjunction with the pin 5 to positively secure the hub to the shaft. As the shaft revolves it, through the medium of the pin 5, rotates the hub which rotates the wings 6 secured thereto by the screws 7.

What is claimed is:—

In a propeller, a rotary shaft, a hub formed with a bore to snugly receive said shaft, a portion of said bore being enlarged to form a recess, the inner end of said recess at its junction with said bore comprising a contracted portion extending radially from said bore, a pin carried by said shaft for passage therewith through the said recess, said pin being adapted for disposal in the said contracted recess portion, wings carried by said hub, and nuts at one end of said shaft cooperating with said pin.

In testimony that I claim the foregoing as my own I have hereto affixed my signature.

WILLIAM G. G. WEIDINGER.